United States Patent

Willinger

[15] 3,640,302
[45] Feb. 8, 1972

[54] SIPHONING DEVICE
[72] Inventor: Allan H. Willinger, New Rochelle, N.Y.
[73] Assignee: Metaframe Corporation, Maywood, N.J.
[22] Filed: Mar. 10, 1970
[21] Appl. No.: 18,112

[52] U.S. Cl. .............................................................137/142
[51] Int. Cl. .........................................................F04f 10/02
[58] Field of Search .................137/142, 143, 144, 145, 153

[56] References Cited

UNITED STATES PATENTS

| 648,325 | 4/1900 | Adams | 137/142 X |
| 2,786,467 | 3/1957 | Price | 128/214 |
| 3,491,787 | 1/1970 | Braun | 137/142 |
| 2,792,013 | 5/1957 | Downs | 137/142 X |

FOREIGN PATENTS OR APPLICATIONS

| 1,227,550 | 3/1960 | France | 137/143 |
| 729,815 | 12/1942 | Germany | 137/144 |

*Primary Examiner*—Henry T. Klinksiek
*Attorney*—Friedman & Goodman

[57] ABSTRACT

A siphoning device having a siphon tube connected to a cup-shaped member for transferring a liquid from a first receptacle containing the liquid to a second receptacle containing a liquid. One end of the tube extends into the cup-shaped member. The other end of the tube is submerged in the liquid of the first receptacle, and the cup-shaped member is immersed in the liquid of the second receptacle. The cup-shaped member is provided with a one-way valve to permit the compressed air to escape therefrom. Removing the liquid from the second receptacle causes the air pressure acting on the liquid in the first receptacle to start the siphoning action.

10 Claims, 5 Drawing Figures

PATENTED FEB 8 1972
3,640,302
FIG. 1.
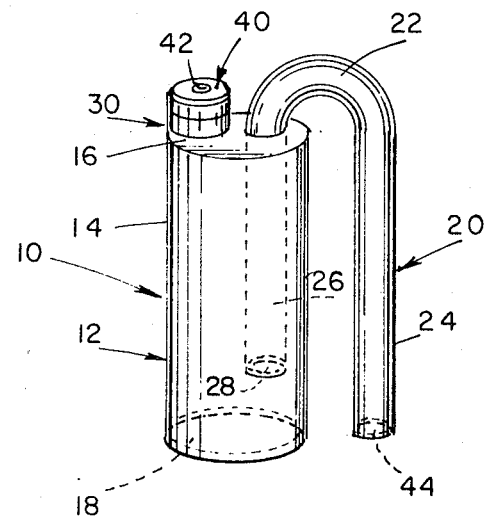
FIG. 2.
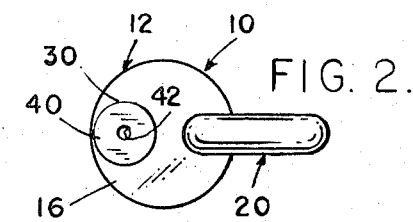
FIG. 3.
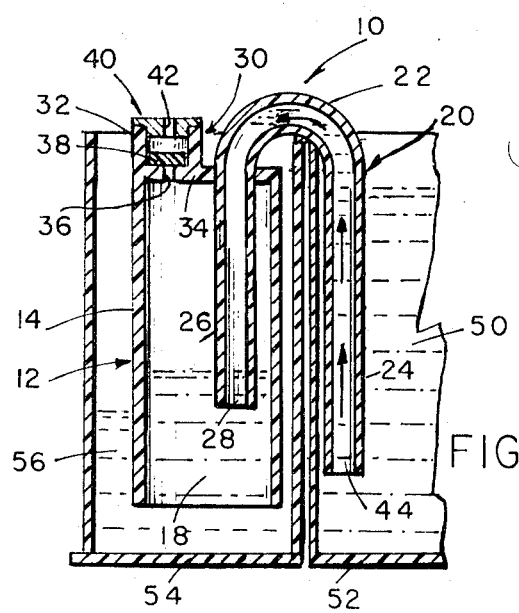
FIG. 5.
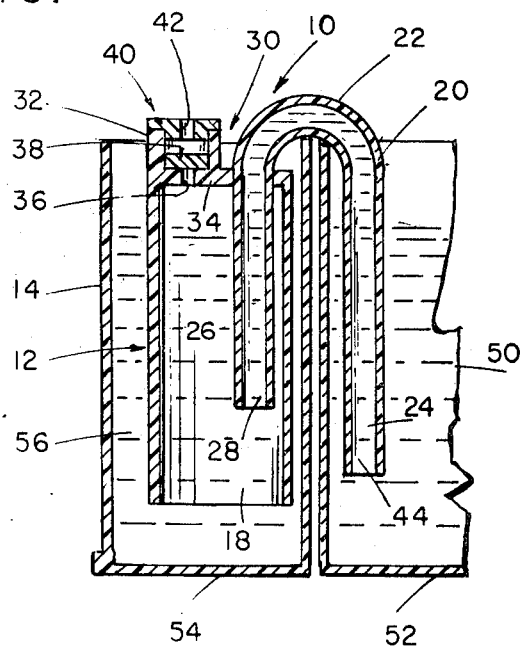
FIG. 4.
INVENTOR.
Allan H. Willinger
BY Friedman & Grodman
Attorneys 3,640,302

SIPHONING DEVICE

BACKGROUND OF THE INVENTION

Siphoning devices are well known, particularly those using a siphon tube, as disclosed in U.S. Pat. No. 3,321,081, granted May 23, 1967 to Willinger. Willinger uses the siphon tube to provide a continuous flow of aquarium water from an aquarium tank into a filter tank for the filtration and aeration of the water which is later returned to the aquarium tank.

Usually, to start the siphoning action to transfer a liquid from a receptacle, the siphon tube is first filled with the liquid and one's finger is placed over an end of the tube to hold the liquid within the tube. The other end of the tube is submerged in the liquid contained within the receptacle. The end of the tube being held by one's finger is positioned outside the receptacle below the level of the liquid within the receptacle. Upon the release of the finger from the end of the tube, the siphoning action will start.

The siphoning action can also be started by submerging one end of the siphon tube in the liquid contained within the receptacle, and the other end of the siphon tube in one's mouth. By drawing the air out of the siphon tube, the air pressure on the liquid within the receptacle will force the liquid upwardly within the siphon tube. Whereupon one's mouth is then removed, whereby the momentum of the liquid filling the siphon tube will start the siphoning action. Accordingly, there has been a long felt need for a simple, inexpensive siphoning device that is free from the user of the device actually or possibly coming in contact with the liquid, whereby some liquids are dangerous to one's person.

Siphoning devices using a bulb to start the siphon tube into operation are also well known, as disclosed in U.S. Pat. No. 2,293,051, granted Aug. 18, 1942 to Duffy, and U.S. Pat. No. 2,737,490, granted Mar. 6, 1956 to Lambertson. Duffy connects a bulb to the discharge leg of the siphon tube to draw the liquid up the other leg to fill the entire siphon tube in order to start the siphoning action. Lambertson connects a bulb to the siphon tube to start the siphoning action either by air or water pressure. By squeezing the Lambertson bulb quickly, the air pressure on the liquid outside of the siphon tube will force the liquid upwardly into the siphon tube, whereby the momentum of the liquid filling the siphon tube will thus start the siphon tube to continuously deliver the liquid. By squeezing the bulb and releasing the same to draw the liquid therein instead of air, one or more squeezes thereafter will force the bulb liquid into the siphon tube to readily start the siphoning action, the latter action being caused by water pressure.

SUMMARY OF THE INVENTION

This invention relates to a siphoning device, and more particularly to a siphoning device that utilizes air pressure to start the siphoning action. A tubelike member of the siphoning device is submerged in a liquid which is to be transferred from a first receptacle to a second receptacle. A chamberlike member of the siphoning device is immersed in a liquid contained in the second receptacle. The chamberlike member is provided with means to permit compressed air to escape therefrom. Removing the liquid from the second receptacle causes the air pressure in the chamberlike member to be reduced, which causes the air pressure acting on the liquid within the first receptacle up the tubelike member, whereby the momentum of the of the liquid filling the tubelike member starts the siphoning action.

Accordingly, an object of the present invention is to provide a device for siphoning a liquid from one receptacle to another receptacle which overcomes the disadvantages of the prior art siphoning devices.

Another object of the invention is to provide a siphoning device which is extremely simple and includes no parts which can get out of order through operation or continued use, whereby the siphoning device can be readily produced and maintained with relatively little expense, which nevertheless is highly efficient in operation and has a relatively long trouble-free life.

A further object of this invention is to provide a siphoning device which can be primed without one's person coming in contact with the liquid being transferred, or any other liquid in connection therewith.

An added object of this invention is to provide an improved siphoning device equipped with means for starting the same by air pressure.

BRIEF DESCRIPTION OF THE DRAWINGS

Having in mind the above and other objects that will be evident from an understanding of this disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it, when read in conjunction with the accompanying drawings in which:

FIG. 1 represents a perspective view of an improved siphoning device pursuant to the present invention;

FIG. 2 represents a top plan view of the siphoning device of this invention illustrated in FIG. 1;

FIGS. 3-5 represent vertical transverse sectional views through the siphoning device of this invention and the receptacles in which the siphoning device is operatively positioned, showing the different liquid levels during the operation of the siphoning device.

DESCRIPTION OF THE PREFERRED EMBODIMENT

Referring to the drawings, FIG. 1 illustrates a siphoning device 10 of the present invention. The siphoning device 10 includes a chamberlike member 12, which is cup shaped to define a hollow cylindrical body 14 closed on one end by a flat top portion 16 and opened on the other end at 18. The siphoning device 10 also includes a siphon tube 20 connected to the chamberlike member 12.

The siphon tube 20 is of the conventional type, having a U-shaped portion 22 connecting two leg portions, 24, 26. The leg portion 24, as shown, is longer than the leg portion 26, however, the leg portion 24 may be made any desirable length. The leg portion 26 extends through an opening in the top portion 16 into the chamberlike member 12. The opening 28 in the end of the leg portion 26 faces the opening 18 in the chamberlike member 12, with the opening 28 being spaced from the opening 18 so that the end of the leg portion 26 lies within the chamberlike member 12.

The leg portion 26 is suitably secured in a substantially permanent manner, as by a suitable adhesive or solvent bond, within the opening in the top portion 16 of the chamberlike member 12 so that an airtight seal is formed therebetween to secure the siphon tube 20 to the chamberlike member 12, whereby no air can pass between the outer wall of the leg portion 26 and the top portion 16. Another method would be to press fit the siphon tube 20 into the opening in the top portion 16 so that the connection is airtight. Obviously, the siphon tube 20 may just as well extend through a wall of the cylindrical body 14, such being considered a matter of design.

The chamberlike member 12 is provided with a one-way valve 30, which is positioned on the top portion 16. Obviously, the valve 30 may also be positioned on a wall of the cylindrical body 14. The cylindrical walls 32 of the valve 30 extend upwardly from the top portion 16, with a section of the top portion 16 providing the bottom 34 thereof, to define a hollow member forming the valve 30, as shown in FIGS. 3-5. An aperture 36 extends vertically through the bottom 34 of the valve 30 so that the space within the valve 30 communicates with the space within the chamberlike member 12.

A flexible member 38, which is preferably round, is positioned within the valve 30, such flexible member 38 being of the conventional type used in valves, being formed from a rubberlike material or other suitable material. The inner diameter of the valve 30 is greater than the diameter of the flexible member 38 so that the flexible member 38 rests on the bottom 34 of the valve 30 and covers the aperture 36, as shown in FIGS. 3-5. The flexible member is free to move up and down within the valve 30 because of its smaller sized diameter.

A cap 40 closes the top of the valve 30 to retain the flexible member 38 within the valve 30. The space between the cap 40 and the bottom 34 is greater than the thickness of the flexible member 38 to permit the upward and downward movement of the flexible member 38. An aperture 42 extends vertically through the cap 40. The cap 40 may be press fitted into the valve 30, or other conventional means may be used to secure the cap 40 to the valve 30, such as screw means, to allow the cap 40 to be removed so that the valve 30 may be cleaned inside if the need arose.

FIG. 2 illustrates a top view of the siphoning device 10, showing the positions of the siphon tube 20 and the valve 30 on the top portion 16 of the chamberlike member 12. The chamberlike member 12, the siphon tube 20 and the valve 30 of the siphoning device 10 are preferably formed, as by molding or otherwise, from a suitable plastic, preferably a transparent plastic so that the operation of the siphoning device 10 may be viewed to determine if the siphoning device is operating properly.

FIGS. 3-5 show the siphoning device 10 in an operative position for the transferring of a liquid 50 from an open receptacle 52 to an open receptacle 54. The receptacle 52 may be a conventional aquarium tank and the receptacle 54 may be a filter receptacle provided with a pump (not shown), such as a centrifugal pump. Such an aquarium filter apparatus is disclosed in the above-mentioned patent, U.S. Pat. No. 3,321,081, whereby the siphoning device 10 of this invention would replace the Willinger siphon tube disclosed in the patent.

The receptacle 54 is positioned adjacent to the receptacle 52. The receptacle 54 if filled with a liquid 56 to a level substantially equal to the level of the liquid 50 in the receptacle 52. Liquid 50 and liquid 56 may be the same type of liquid, such as water, but the siphoning device 10 of this invention would function even if different types of liquids were used.

The chamberlike member 12 is positioned in the receptacle 54 with both the opening 18 of the chamberlike member 12 and the opening 28 of the leg portion 26 being submerged in the liquid 56. The leg portion 24 is positioned in the receptacle 54 with its opening 44 being submerged in the liquid 50. The levels of the liquids 50, 56 should be substantially above the openings 44, 28, respectively. The U-shaped portion 22 of the siphon tube 20 abuts the edges of the receptacle 52, 54 to support the siphoning device 10 in its operative position in each of the receptacles 52, 54, whereby the siphoning device 10 is in a hanging position. Obviously, other suitable means may be used to support the siphoning device 19 in the operative position.

As the chamberlike member 12 is immersed in the liquid 56, the liquid 56 fills the chamberlike member 12 and tends to compress the air therein, which causes an increase in the air pressure within the chamberlike member 12. However, this increased air pressure forces the flexible member 38 upwards to uncover the aperture 36 formed in the bottom 34 of the valve 30 so that the excess air is forced out through the aperture 36 into the valve 30. Within the valve 30, the excess air is forced around the flexible member 38, and then is forced through the aperture 42 formed in the cap 40, to finally escape to the atmosphere outside the siphoning device 10.

Once the siphoning device 10 is in the operating position, the air pressure in the chamberlike member 12 is equal to the atmosphere pressure acting on the liquids 50, 56 of the receptacles 52, 54, respectively, due to the function of the valve 30. These equal pressures cause the liquid 50 of the receptacle 52 and the liquid 56 of both the receptacle 54 and the chamberlike member 12 to have the same level, as shown in FIG. 3. This is true because the levels of the liquids 50, 56 were the same at the start. However, if the levels of the liquids 50, 56 were not the same at the start, they would not be the same now even though the siphoning device 10 is in the operative position. But, nonetheless, the liquid 56 would have the same level in the chamberlike member 12 as in the receptacle 54, and the siphoning device 10 would still function properly, as set forth below.

Because the leg portion 26 of the siphon tube 20 is within the chamberlike member 12 and is substantially spaced from the opening 18, the air pressure within the chamberlike member 12 effects the level of the liquid 56 within the leg portion 26. The atmospheric pressure acting on the liquid 50 of the receptacle 52 effects the level of the liquid 50 within the leg portion 24. Inasmuch as these pressures are equal and the levels of the liquids 50, 56 within the receptacle 52 and the chamberlike member 12, respectively, are the same as stated above, the level of the liquid 50 within the leg portion 24 is the same as the level of the liquid 56 within the leg portion 26.

To start the siphoning action, some of the liquid 56 is removed from the receptacle 54, such as by a centrifugal pump as mentioned above in connection with the filter receptacle of U.S. Pat. No. 3,321,081, to lower the level of the liquid 56 within the receptacle 54. This causes the air pressure within the chamberlike member 12 to force the level of the liquid 50 to lower in the chamberlike member 12 in an attempt to balance the level of the liquid 56 in the chamberlike member 12 with the level of the liquid 56 in the receptacle 54. The volume of air within the chamberlike member 12 is increased as the level of the liquid 56 drops therein. However, because the flexible member 38 closes the valve 30 so that no air can enter the chamberlike member 12 through the opening 36 in the bottom 34 of the valve, the air pressure within the chamberlike member 12 is reduced as the volume of the air is increased. The result is that as the level of the liquid 56 drops within the chamberlike member 12 the air pressure therein is further reduced. Also, the difference between the atmospheric pressure acting on the top of the flexible member 38 and the reduced air pressure within the chamberlike member 12 acting on the bottom of the flexible member 38, would tend to keep the flexible member 38 of the valve 30 in the closed position to prevent the air from entering the chamberlike member 12 through the opening 36 of the valve 30.

The air pressure within the siphon tube 20 forces the level of the liquid 56 in the leg portion 26 to drop, at first in an attempt to balance the level of the liquid 56 in the leg portion 26 with the level of the liquid 56 in the chamberlike member 12, and then because the air pressure within the siphon tube 20 is greater than the air pressure within the chamberlike member 12. The volume of air within the siphon tube 20 tends to increase as the level of the liquid 56 drops therein, which in turn would tend to reduce the air pressure therein. However, the atmospheric pressure acting on the liquid 50 in the receptacle 52 forces the liquid 50 up the leg portion 24 against the reduced air pressure therein, to fill the additional volume of air within the siphon tube 20, tending to maintain the original air pressure and the original volume of air within the siphon tube 20. Therefore, as the level of the liquid 56 continues to drop in the leg portion 26, the level of the liquid 50 continues to rise in the leg portion 24 of the siphon tube 20. It is also noted that if the liquid 56 is discharged into the receptacle 52, this would raise the level of the liquid in the receptacle 52, which in turn will also cause the level of the liquid in the leg portion 24 to rise.

The level of the liquid 56 in the receptacle 54 will continue to be lowered until the approximate levels of the liquids shown in FIG. 4 are reached. At this point, the air pressure in the chamberlike member 12 has been so reduced that the atmospheric pressure acting on the liquid 50 has forced the liquid 50 up the leg portion 24 into the U-shaped portion 22 of the siphoning tube 20. Any further reduction in the level of the liquid 56 in the receptacle 54 will cause the atmospheric pressure, which acts on the liquid 50, to force the liquid 50 into the upper part of the leg portion 26. The liquid 50, once in the upper part of the leg portion 26, will tend to move downwardly at a faster rate into the air space therebelow, whereby the momentum of the liquid 50 moving through the siphon tube 20 will start the siphoning action.

It is noted that if the valve 30 did not prevent the air from passing back into the chamberlike member 12, the air pressure in the chamberlike member 12 would always be equal to the atmospheric pressure acting on the liquid 50 in the receptacle 52. This would tend to balance the liquid levels in the siphon tube 20, where the level of the liquid 56 in the leg portion 26 will drop slightly, and the level of the liquid 50 in the leg portion 24 will rise slightly, but not enough to start the siphoning action.

The siphoning action of the transferring of the liquid 50 from the receptacle 52 to the receptacle 54 will normally continue until the levels of the liquids in the receptacles 52, 54 are equal or until the level of the liquid 50 in the receptacle 52 reaches the opening 44 in the leg portion 24 of the siphon tube 20. However, if the siphoning device 10 is used with an aquarium filter apparatus, such as disclosed in the above U.S. Pat. No. 3,321,081, wherein the aquarium liquid once filtered is returned to the aquarium tank, the siphoning action will continue until the level of the liquid in the receptacle 54 is raised again to be equal to the level of the liquid in the receptacle 52, as shown in FIG. 5. At this point, the air pressure in the chamberlike member 12, is again equal to the atmospheric pressure acting on the liquids in the receptacles 52, 54. This balance of air pressure maintains the siphon tube 20 in a primed condition, that is, the siphon tube 20 is filled with the liquid. It is noted that once a siphon tube is in a primed condition, a conventional siphoning action will start when the level of the liquid in one receptacle is lower than the level of the liquid in the other receptacle with the liquid being transferred to the receptacle with the lower level. Therefore, the siphoning action will start again when the level of the liquid within the receptacle 54 is lower than the level of the liquid within the receptacle 52, so as to provide a continuous flow of the aquarium liquid from the aquarium into the filter tank for filtration and of the return of the liquid into the aquarium tank.

If the siphoning device 10 of this invention is used in an aquarium tank, the leg portion 24 of the siphon tube 20 may have a housing mounted thereon, the housing being provided with a plurality of apertures, where the apertures serve to prevent the passage of fish or other aquarium inhabitants into the siphon tube 20. The siphoning device 10 may also be used for continuously returning the filtered liquid from a receptacle into an aquarium.

Numerous alterations of the structure herein disclosed will suggest themselves to those skilled in the art. HOwever, it is to be understood that the present disclosure relates to a preferred embodiment of the invention which is for purposes of illustration only, and not to be construed as a limitation of the invention.

What is claimed is:

1. A siphoning device for transferring a liquid from a first receptacle to a second receptacle, said device comprising a U-shaped tube having first and second leg portions, said first leg portion being adapted to be disposed within the first receptacle and supported below the liquid level thereof, a chamberlike member provided with an opening to permit liquid to pass into and out of said chamberlike member, said tube being connected to said chamberlike member with said second leg portion extending into said chamberlike member, said chamberlike member being adapted to be disposed within the second receptacle and supported therein with said opening submerged in a body of liquid contained within the second receptacle so that said second leg portion is below the surface of the body of liquid, said chamberlike member being provided with one-way valve means to permit compressed air within said chamberlike member to escape therefrom and to prevent air from entering said chamberlike member through said valve means, whereby reducing the surface level of the liquid in the second receptacle also reduces the level of the liquid in both said chamberlike member and said second leg portion, thereby causing the air pressure in said chamberlike member to be reduced so that the air pressure acting on the liquid in the first receptacle forces the first receptacle liquid into said first leg portion to start the siphoning action.

2. A siphoning device according to claim 1 wherein said chamberlike member and said U-shaped tube are formed from a plastic material.

3. A siphoning device according to claim 2 wherein said plastic material is transparent so that the operation of said siphoning device maybe viewed.

4. A siphoning device according to claim 1 wherein said valve means includes walls connected to said chamberlike member and extended therefrom to enclose an outer wall section of said chamberlike member to define a hollow valve member, said section being provided with an aperture extending therethrough into said chamberlike member, a flexible member being positioned within said hollow valve member and resting against said section to cover said aperture in said section.

5. A siphoning device according to claim 4 wherein cap means closes said valve member to retain said flexible member therein, said cap means being spaced from said section of said chamberlike member to permit movement of said flexible member away from said section to uncover said aperture in said section, said cap means being provided with an aperture to permit air within said valve member to escape therefrom.

6. A siphoning device according to claim 1 wherein said chamberlike member is cup-shaped to define a hollow-cylindrical body closed on one end by a top portion, said opening of said chamberlike member being opposite said top portion, said second leg portion extending through said top portion, said second leg portion having its opened end within said chamberlike member, said opened end being spaced from said opening of said chamberlike member.

7. A siphoning device according to claim 6 wherein said chamberlike member and said U-shaped tube are formed from a plastic material.

8. A siphoning device according to claim 7 wherein said plastic material is transparent so that the operation of said siphoning device may be viewed.

9. A siphoning device according to claim 6 wherein said valve means includes walls connected to said top portion of said chamberlike member and extended upwardly therefrom to enclose an outer section of said top portion to define a hollow valve member, said section being provided with an aperture extending therethrough into said chamberlike member, a flexible member being positioned within said hollow valve member and resting against said section to cover said aperture in said section.

10. A siphoning device according to claim 9 wherein cap means closes said valve member to retain said flexible member therein, said cap means being spaced from said section of said top portion to permit movement of said flexible member away from said section to uncover said aperture in said section, said cap means being provided with an aperture to permit air within said valve members to escape therefrom.

* * * * *